United States Patent
Morioka

(10) Patent No.: US 9,584,348 B2
(45) Date of Patent: Feb. 28, 2017

(54) WIRELESS COMMUNICATION DEVICE, PROGRAM, WIRELESS COMMUNICATION METHOD, AND WIRELESS COMMUNICATION SYSTEM

(75) Inventor: Yuichi Morioka, Tokyo (JP)

(73) Assignee: Sony Corporation, Tokyo (JP)

( * ) Notice: Subject to any disclaimer, the term of this patent is extended or adjusted under 35 U.S.C. 154(b) by 510 days.

(21) Appl. No.: 13/817,558

(22) PCT Filed: Aug. 3, 2011

(86) PCT No.: PCT/JP2011/067751
§ 371 (c)(1),
(2), (4) Date: Feb. 19, 2013

(87) PCT Pub. No.: WO2012/032883
PCT Pub. Date: Mar. 15, 2012

(65) Prior Publication Data
US 2013/0142127 A1 Jun. 6, 2013

(30) Foreign Application Priority Data

Sep. 10, 2010 (JP) ................................ 2010-203407

(51) Int. Cl.
*H04L 25/08* (2006.01)
*H04L 1/18* (2006.01)
*H04W 74/08* (2009.01)
*H04W 84/12* (2009.01)

(52) U.S. Cl.
CPC ............ *H04L 25/08* (2013.01); *H04L 1/1887* (2013.01); *H04L 1/1896* (2013.01); *H04W 74/0816* (2013.01); *H04W 84/12* (2013.01)

(58) Field of Classification Search
None
See application file for complete search history.

(56) References Cited

U.S. PATENT DOCUMENTS

| 8,855,063 | B2* | 10/2014 | Gong | 370/329 |
| 2005/0047428 | A1* | 3/2005 | Park et al. | 370/445 |
| 2005/0285719 | A1* | 12/2005 | Stephens | H04W 74/06 340/10.2 |
| 2006/0268816 | A1 | 11/2006 | Adachi et al. | |

(Continued)

FOREIGN PATENT DOCUMENTS

| EP | 2200386 A2 | 6/2010 |
| JP | 2006-333271 A | 12/2006 |

(Continued)

OTHER PUBLICATIONS

International Search Report Issued Nov. 8, 2011 in PCT/JP2011/067751.

(Continued)

*Primary Examiner* — Ayaz Sheikh
*Assistant Examiner* — Tarell Hampton
(74) *Attorney, Agent, or Firm* — Chip Law Group

(57) ABSTRACT

Provided is a wireless communication device, including a data processing unit that generates a data packet, and a transmitter unit that transmits the data packet generated by the data processing unit, wherein the data processing unit sets information for use other than an NAV setting to a Duration field in the data packet.

9 Claims, 13 Drawing Sheets

(56) References Cited

U.S. PATENT DOCUMENTS

| | | | |
|---|---|---|---|
| 2006/0291498 A1* | 12/2006 | Stephens | H04W 48/08 370/437 |
| 2007/0037548 A1 | 2/2007 | Sammour et al. | |
| 2007/0133542 A1* | 6/2007 | Kangude | H04L 29/12783 370/392 |
| 2008/0117850 A1* | 5/2008 | Agrawal et al. | 370/311 |
| 2008/0298306 A1* | 12/2008 | Larsson | H04L 1/0002 370/328 |
| 2010/0039974 A1 | 2/2010 | Toshimitsu et al. | |
| 2010/0074198 A1* | 3/2010 | Morioka | H04L 12/413 370/329 |
| 2010/0158494 A1* | 6/2010 | King | 396/56 |
| 2011/0261708 A1* | 10/2011 | Grandhi | H04W 24/10 370/252 |
| 2012/0320856 A1* | 12/2012 | Kim | H04W 28/26 370/329 |

FOREIGN PATENT DOCUMENTS

| | | |
|---|---|---|
| JP | 2008-252867 A | 10/2008 |
| JP | 2010-28874 A | 2/2010 |
| JP | 2010-45561 A | 2/2010 |
| WO | 2005034397 A1 | 4/2005 |
| WO | 2006071054 A1 | 7/2006 |

OTHER PUBLICATIONS

Extended European Search Report issued on Oct. 19, 2015 in patent application No. 11823362.6.

Office Action for EP Patent Application No. 11823362.6, issued on Dec. 14, 2016, 6 pages of Office Action.

* cited by examiner

WIRELESS COMMUNICATION DEVICE, PROGRAM, WIRELESS COMMUNICATION METHOD, AND WIRELESS COMMUNICATION SYSTEM

TECHNICAL FIELD

The present disclosure relates to a wireless communication device, a program, a wireless communication method, and a wireless communication system.

BACKGROUND ART

In recent years, a wireless LAN (Local Area Network) system, which is typified by IEEE (Institute of Electrical and Electronics Engineers) 802.11, has come into wide use instead of a wired network owing to advantages of a high degree of freedom of equipment and the like. For example, IEEE 802.11a/g has come into wide use and IEEE 802.11n is expected to become widely available in the future.

Currently, IEEE 802.11 ac is supposed to be employed as a next-generation wireless LAN standard. The IEEE 802.11ac is expected to employ SDMA (Space Division Multiple Access) in which wireless resources on a spatial axis are shared among a plurality of users. SDMA enables simultaneous one-to-many communications using the same frequency, which makes it possible to seek a significant improvement of the transmission rate.

A fair number of wireless LAN systems avoid interference between wireless communication devices by access control based on carrier sense, such as CSMA/CA (Carrier Sense Multiple Access with Collision Avoidance).

A data packet defined by IEEE 802.11 contains the Duration field. A wireless communication device having received the data packet avoids interference by setting NAV (Network Allocation Vector: transmission suppression period) based on a Duration value set to the Duration field. Interference avoidance based on the Duration value is described in, for example, Patent Literature 1.

CITATION LIST

Patent Literature

Patent Literature 1: JP 2008-252867A

SUMMARY OF INVENTION

Technical Problem

However, the NAV setting based on the Duration value is expected to become more difficult as new communication standards such as IEEE 802.11n and IEEE 802.11ac described above come into wide use. For example, third parties to whom no support of a fast rate by MIMO or the like defined in IEEE 802.11n is provided cannot decode a data packet transmitted at the fast rate and thus, do not set NAV even if a data packet transmitted at the fast rate is received.

In addition, a data packet is transmitted by forming directivity by SDMA defined in IEEE 802.11ac and thus, a case when a data packet transmitted by SDMA may not reach third parties is assumed. Moreover, even if the data packet transmitted by SDMA reaches third parties, a case when it is difficult to decode the data packet due to interference with other multiplexed data packets is also assumed.

That is, the value of setting the Duration value for the NAV setting to the Duration field in a data packet is considered to decrease as a new communication standard comes into wide use.

Therefore, the present disclosure proposes a novel and improved wireless communication device capable of effectively employing the Duration field contained in a data packet, a program, a wireless communication method, and a wireless communication system.

Solution to Problem

According to an embodiment of the present disclosure, there is provided a wireless communication device including a data processing unit that generates a data packet, and a transmitter unit that transmits the data packet generated by the data processing unit. The data processing unit sets information for use other than an NAV setting to a Duration field in the data packet.

The data processing unit may set timing information specifying transmission timing of an acknowledge packet to the data packet from a destination wireless communication device to the Duration field in the data packet.

The transmitter unit may multiplex a plurality of data packets for each of a plurality of wireless communication devices generated by the data processing unit to transmit the data packets, and the data processing unit may set the timing information to the Duration field of each of the plurality of data packets so that the transmission timing of the acknowledge packet from each of the plurality of wireless communication device is different.

The data processing unit may set the timing information so that the acknowledge packet transmitted from each of the plurality of wireless communication devices is not overlapped on a time axis.

The timing information may be information specifying a time interval between an end of receipt of the Duration field and transmission of the acknowledge packet.

The timing information may be information specifying a time interval between an end of receipt of the data packet and transmission of the acknowledge packet.

The transmitter unit may multiplex a plurality of data packets for each of a plurality of wireless communication devices generated by the data processing unit to transmit the data packets, at least one of the plurality of data packets has padding to cause packet lengths of the plurality of data packets to match added thereto, and the data processing unit may set information to identify a position of the padding in the data packet to the Duration field in the data packet.

Further, according to another embodiment of the present disclosure, there is provided a program causing a computer to function as a data processing unit that generates a data packet having a Duration field to which information for use other than an NAV setting is set, and a transmitter unit that transmits the data packet generated by the data processing unit.

Further, according to another embodiment of the present disclosure, there is provided a wireless communication method including generating a data packet having a Duration field to which information for use other than an NAV setting is set, and transmitting the data packet.

Further, according to another embodiment of the present disclosure, there is provided a wireless communication system including a first wireless communication device, and a second wireless communication device having a data processing unit that generates a data packet having a Duration field to which information for use other than an NAV setting is set and a transmitter unit that transmits the data packet generated by the data processing unit to the first wireless communication device.

Advantageous Effects of Invention

According to the present disclosure, as described above, the Duration field contained in a data packet can effectively be employed.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

In the present specification and drawings, a plurality of elements that have substantially the same function and structure may be denoted by the same reference sign followed by different numbers. For example, a plurality of elements that have substantially the same function and structure may be denoted by stations 20#1, 20#2 and 20#3 or branches 40-1, 40-2 and 40-N. However, if a plurality of elements that have substantially the same function and structure do not have to be differently denoted, the plurality of elements are only denoted by the same sign. For example, if the stations 20#1, 20#2 and 20#3 do not have to be differently denoted, the stations are denoted by the same reference sign, i.e., 20.

"Detailed Descriptions of Embodiments" will be described in the following order:

1. Structure of Wireless Communication System
2. Interference Avoidance Control by IEEE
3. Basic Structure of Wireless Communication Device
4. Description of Each Embodiment
 4-1. First Embodiment
 4-2. Second Embodiment
 4-3. Third Embodiment
5. Summary <1. Structure of Wireless Communication System>

Firstly, a structure of a wireless communication system 1 according to an embodiment of the present disclosure will be described with reference to FIG. 1.

Figure 1:
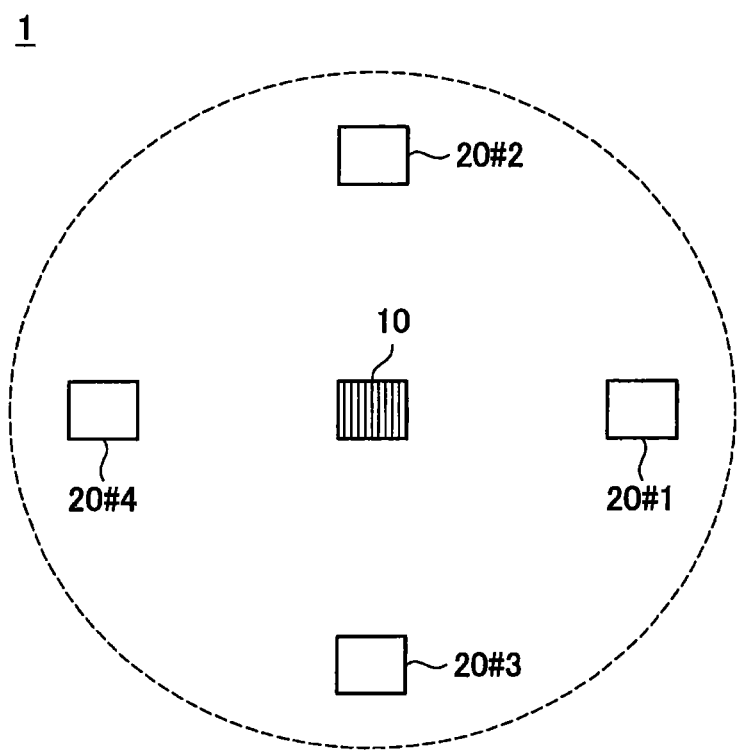
FIG. 1 is an explanatory diagram illustrating a structure of a wireless communication system according to an embodiment of the present disclosure.

FIG. 1 is an explanatory diagram illustrating a structure of a wireless communication system 1 according to an embodiment of the present disclosure. As shown in FIG. 1, the wireless communication system 1 according to the embodiment of the present disclosure includes an access point 10, stations 20#1~20#4.

According to an example shown in FIG. 1, the stations 20#1~20#4 are located under control of the access point 10, and a plurality of wireless communication devices made up of the stations 20#1~20#4 and the access point 10 constitute a communication group 1 (BSS: Basic Service Set).

The access point 10 is a wireless communication device conforming to, for example, IEEE 802.11ac and performs SDMA (Space Division Multiple Access) by means of an adaptive array antenna. Specifically, the access point 10 establishes a one-to-many communication by multiplexing packets transmitted to a plurality of stations 20 with respect to the same time axis and the same frequency band or by separating packets, which are transmitted from a plurality of stations 20 through the same time axis and the same frequency band, by transmission sources. Further, the access point 10 may establish a one-to-one communication with each of the stations 20.

Like the access point 10, the station 20 is also a wireless communication device conforming to, for example, IEEE 802.11 ac and performs SDMA (Space Division Multiple Access) by means of an adaptive array antenna. However, the station 20 may include fewer antennas than the access point 10 since the station 20 performs separation of packets upon receipt of the packets but does not perform multiplexing of packets to be transmitted. Some of the stations 20#1~20#4 may be a wireless communication device conforming to a traditional standard, such as IEEE 802.11a/g/n.

Figure 2:
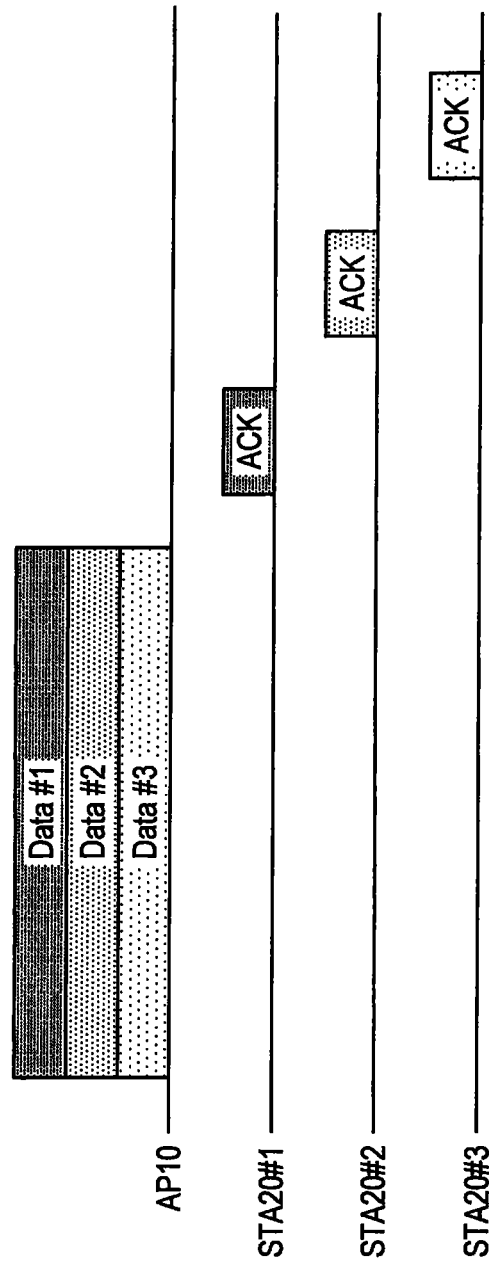
FIG. 2 is an explanatory diagram illustrating a concrete example of SDMA communication.
Figure 3:
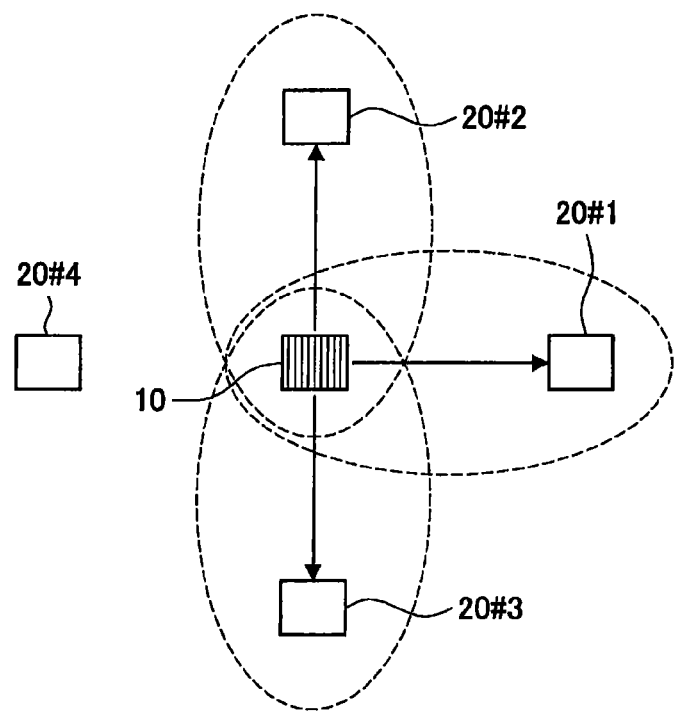
FIG. 3 is an explanatory diagram illustrating a concrete example illustrating a radio wave coverage by SDMA communication.

A concrete example of SDMA communication between the access point 10 and the station 20 will be described with reference to FIGS. 2 and 3. FIG. 2 is an explanatory diagram illustrating a concrete example of SDMA communication. As shown in FIG. 2, the access point 10 spatially multiplexes data packets #1 to #3 (Data #1 to #3) for the stations 20#1 to 20#3 respectively before transmission. More specifically, as shown in FIG. 3, the access point 10 transmits the data packet #1 for the station 20#1 in the direction of the station 20#1, the data packet #2 for the station 20#2 in the direction of the station 20#2, and the data packet #3 for the station 20#3 in the direction of the station 20#3.

Then, when the stations 20#1 to 20#3 receive the data packets from the access point 10, the stations 20#1 to 20#3 transmit ACK (acknowledge packet) to the access point 10. According to the SDMA communication described above, simultaneous one-to-many communications employing the same frequency are enabled, which makes it possible to seek a significant improvement of the transmission rate.

It may be determined upon manufacturing a wireless communication device or by negotiation upon processing a connection of a wireless communication device whether the wireless communication device will operate as the access point 20 (Group Owner) or the station 10 (Client).

The wireless communication device, such as the access point 10 and the station 20, is not limited to any specific hardware type. For example, the wireless communication device, such as the access point 10 and the station 20, may be an information processing device, such as a PC (Personal Computer), a household image processing device (e.g., a DVD recorder, a video deck, or the like), a PDA (Personal Digital Assistant), a household game machine, or a household appliance. Further, the wireless communication device, such as the access point 10 and the station 20, may be an information processing device, such as a mobile phone, a PHS (Personal Handyphone System), a portable music player, a portable image processing device, or a portable game machine.

<2. Interference Avoidance Control by IEEE 802.11>

An overall structure of the wireless communication system 1 according to an embodiment of the present disclosure will be described below. Subsequently, to clarify the significance of the embodiment of the present disclosure, interference avoidance control in IEEE 802.11 will be described before a detailed description of the embodiment of the present disclosure.

Figure 4:
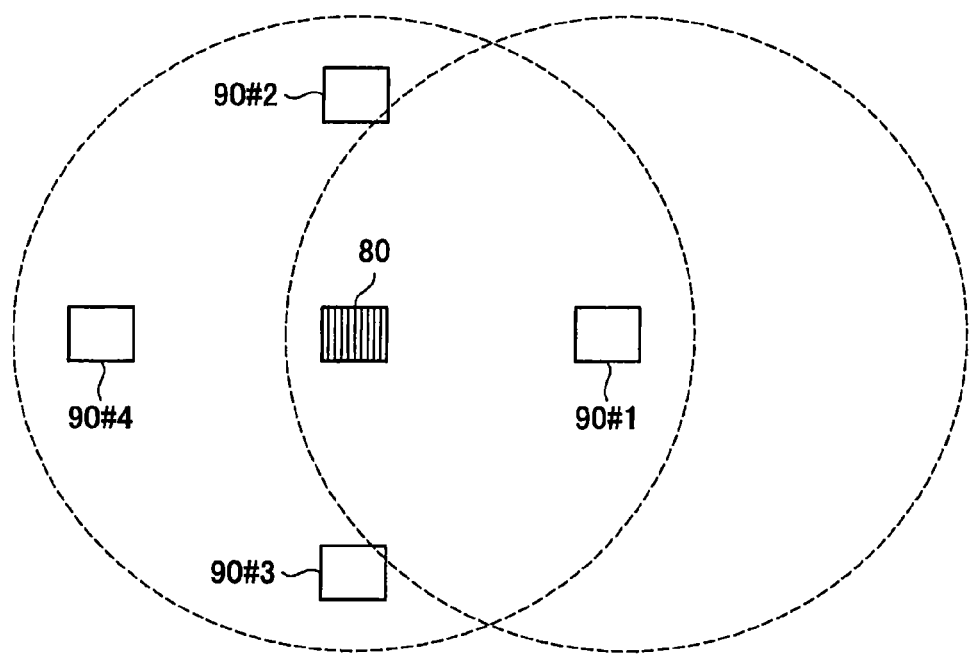
FIG. 4 is an explanatory diagram illustrating a wireless communication system according to a comparative example.

FIG. 4 is an explanatory diagram illustrating a wireless communication system according to a comparative example. According to an example shown in FIG. 1, a signal transmitted by the access point 80 reaches all stations 90#1 to 90#4, but a signal transmitted by the stations 90#1 to 90#4 reaches only the access point 80.

A case when the access point 80 transmits a data packet to the station 90#1 in such a wireless communication system will be considered. In this case, the station 90#1 transmits ACK to the access point 80 in response to receipt of the data packet. However, the data packet transmitted by the access point 80 reaches the station 90#4, but ACK transmitted by the station 90#1 does not reach the station 90#4.

Thus, when transmission is requested, the station 90#4 starts packet transmission after observing a non-signal state for a fixed period upon receipt of the data packet based on rules of CSMA. The packet transmitted by the station 90#4 may prevent receipt of ACK from the station 90#1 by the access point 80.

(Duration)

Figure 5:
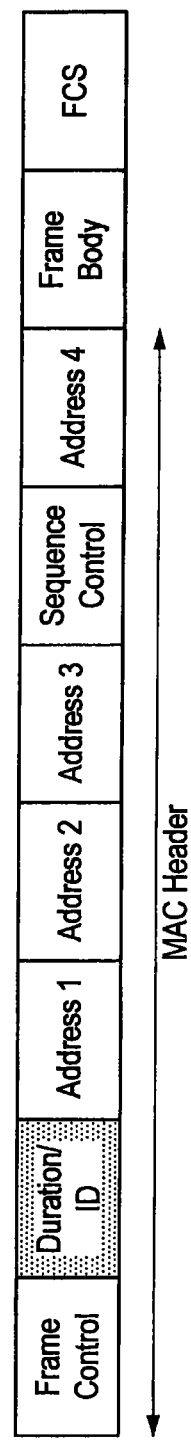
FIG. 5 is an explanatory diagram illustrating a packet structure example defined by IEEE 802.11.

To prevent the interference as described above, IEEE 802.11 adopting CSMA as an access method has, as shown in FIG. 5, a field called Duration defined in a transmission packet.

FIG. 5 is an explanatory diagram illustrating a packet structure example defined by IEEE 802.11. As shown in FIG. 5, a packet defined by IEEE 802.11 is constituted of the MAC header, Frame Body, and FCS (Frame Check Sequence).

The MAC header contains Frame Control, Duration/ID, Address 1 to 3, Sequence Control, and Address 4. A Duration value is written into the Duration/ID field in a data packet and a wireless communication device having received the data packet sets a transmission suppression period called NAV according to the Duration value. The NAV setting will be described in detail with reference to FIG. 6.

(NAV Setting)

Figure 6:
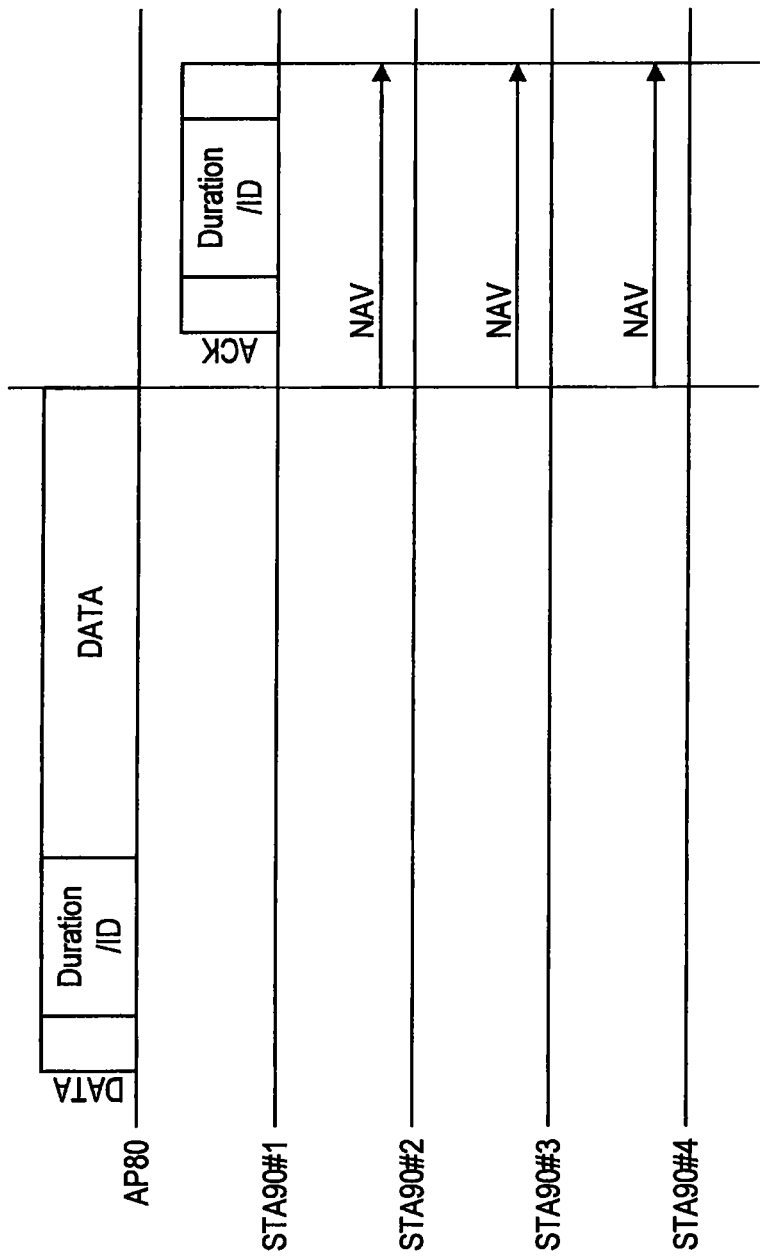
FIG. 6 is an explanatory diagram illustrating a NAV setting by each station.

FIG. 6 is an explanatory diagram illustrating the NAV setting by each of the stations 90. When the access point 80 transmits a data packet to the station 90#1 after writing the Duration value into the Duration field in the arrangement shown in FIG. 4, the station 90#1 transmits, as shown in FIG. 6, ACK to the access point 80.

The stations 90#2 to 90#4 that are not the destination of the data packet, on the other hand, set NAV until ACK transmission by the station 90#1 is completed according to the Duration value written in the Duration field. With the structure described above, a case when the stations 90#2 to 90#4 prevent receipt of ACK from the station 90#1 by the access point 80 can be prevented.

(Packet Structure in Succeeding Standards)

In a wireless communication system such as IEEE 802.11 that is revised, the header starting portion in a packet is standardized and a new field is added to the end of the header each time the standard is revised from the viewpoint of securing downward compatibility and diversion of existing hardware. Concrete examples of the packet structure in succeeding standards will be described below with reference to FIGS. 7 and 8.

Figure 7:
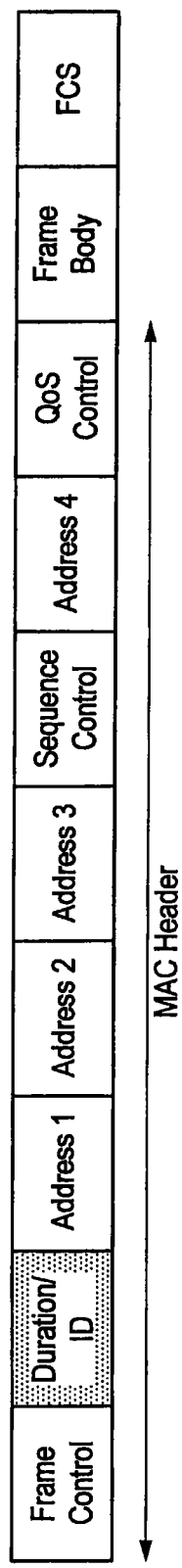
FIG. 7 is an explanatory diagram illustrating a concrete example of the packet structure defined by IEEE 802.11e.

FIG. 7 is an explanatory diagram illustrating a concrete example of the packet structure defined by IEEE 802.11e. As shown in FIG. 7, the MAC header of a packet defined by IEEE 802.11e has a new field called Qos Control added to the MAC field described with reference to FIG. 5.

Figure 8:
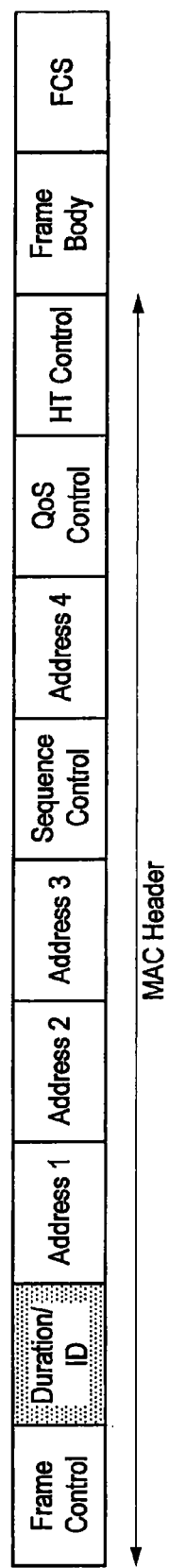
FIG. 8 is an explanatory diagram illustrating a concrete example of the packet structure defined by IEEE 802.11n.

FIG. 8 is an explanatory diagram illustrating a concrete example of the packet structure defined by IEEE 802.11n. IEEE 802.11n succeeding IEEE 802.11e has, as shown in FIG. 8, a field called HT Control further added to the MAC header in IEEE 802.11e.

However, a packet defined by IEEE 802.11e and a packet defined by IEEE 802.11n have, as shown in FIGS. 7 and 8, the common header starting portion including the Address field and the Duration field.

(Decrease in Value of the Duration Field)

IEEE 802.11 has, as described above, the Duration field defined in the MAC header for the purpose of avoiding interference. However, the NAV setting based on the Duration value is expected to become more difficult as new communication standards such as IEEE 802.11n and IEEE 802.11ac come into wide use. For example, third parties to whom no support of a fast rate by MIMO or the like defined in IEEE 802.11n is provided cannot decode a data packet transmitted at the fast rate and thus, do not set NAV even if a data packet transmitted at the fast rate is received.

In addition, a data packet is transmitted by forming directivity by SDMA defined in IEEE 802.11ac and thus, a case when a data packet transmitted by SDMA may not reach third parties is assumed. For example, as shown in FIG. 3, each data packet transmitted to the stations 20#1 to 20#3 does not reach the station #4 as a third party. Moreover, even if a data packet transmitted by SDMA reaches third parties, a case when it is difficult to decode the data packet due to interference with other multiplexed data packets is also assumed.

That is, the value of setting the Duration value for the NAV setting to the Duration field in a data packet is considered to decrease as a new communication standard comes into wide use.

With the above circumstances focused on, an embodiment of the present disclosure has been developed. According to the embodiment of the present disclosure, the packet structure can be made more efficient by effectively employing the Duration field in a data packet to compress control information. Such an embodiment of the present disclosure will be described in detail below.

<3. Basic Structure of Wireless Communication Device>

The present disclosure can be carried out in various forms, as will be described in detail in "4-1. First Embodiment" to "4-3. Third Embodiment" as an example. A wireless communication device in each embodiment such as the access point 10 includes A: a data processing unit (48) that generates a data packet, and B: transmitter units (42, 46) that transmit the data packet generated by the data processing unit, wherein C: the data processing unit sets information for use other than an NAV setting to a Duration field in the data packet.

A basic structure common to wireless communication devices such as the access point 10 and the stations 20 according to each embodiment will first be described below with reference to FIG. 9.

Figure 9:
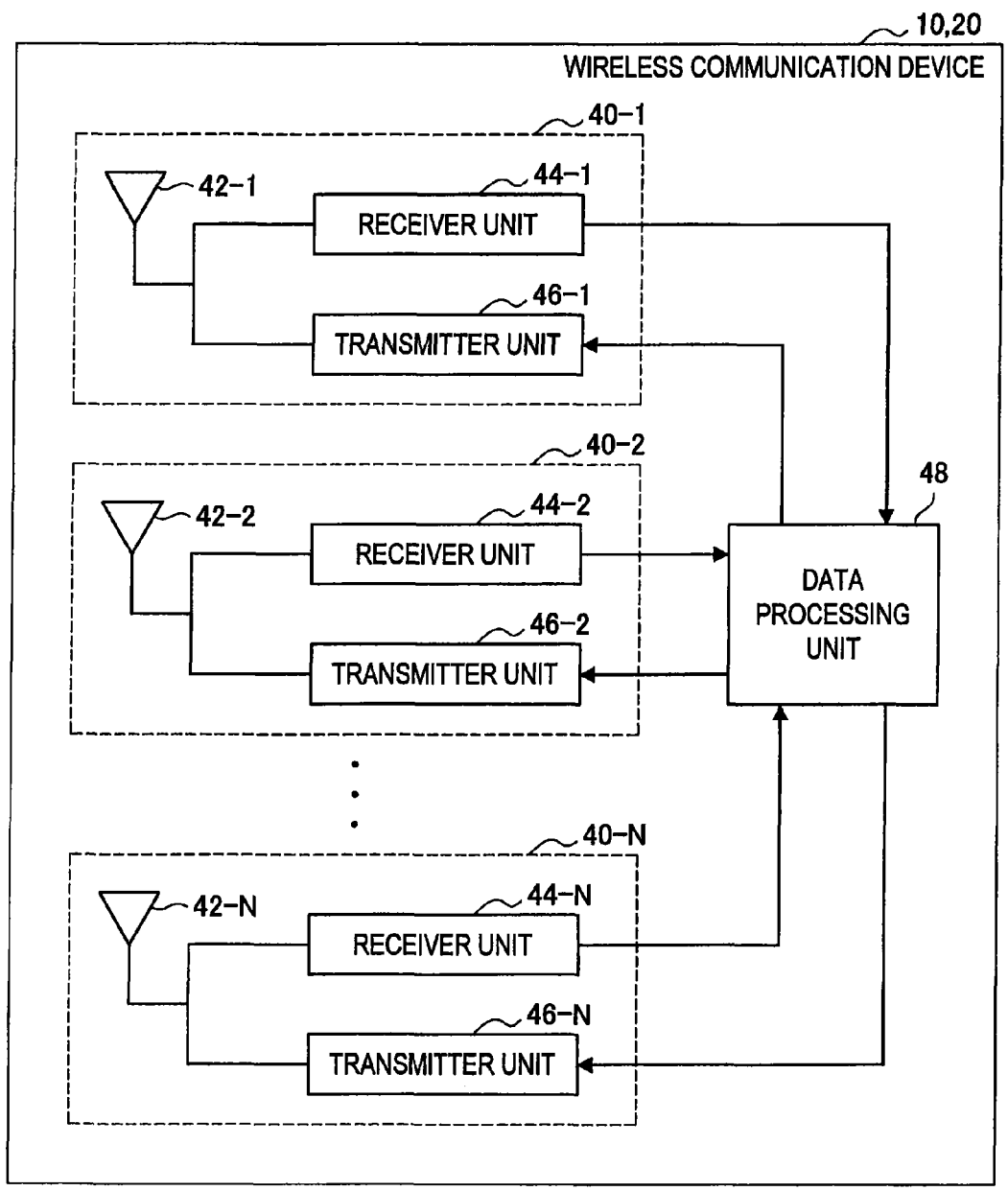
FIG. 9 is an explanatory diagram illustrating the structure of a wireless communication device according to an embodiment of the present disclosure such as an access point and a station.

FIG. 9 is an explanatory diagram illustrating the structure of a wireless communication device according to an embodiment of the present disclosure such as the access point 10 and the station 20. As shown in FIG. 9, a wireless communication device according to an embodiment of the present disclosure includes N branches 40-1 to 40-N and a data processing unit 48. Each of the branches 40 includes an antenna element 42, a receiver unit 44, and a transmitter unit 46.

That is, the wireless communication device includes N antenna elements 42-1~42-N and may function the N antenna elements 42-1~42-N as adaptive array antennas by multiplying communication packets by each of the antenna elements 42 by appropriate weights. The wireless communication device operating as the access point 10 may increase the number of stations which can establish a simultaneous communication by SDMA by including more antenna elements 42.

The data processing unit 48 generates transmission packets and distributes the transmission packets to the branches 42-1~42-N in response to the transmission request of an upper-layer application. More specifically, the data processing unit 48 of the wireless communication device operating as the access point 10 generates transmission packets for each of the stations 20 and multiplies each of the transmission packets by a transmission weight for an adaptive array antenna of each of the branches 42. The data processing unit 48 supplies the transmission packets, which have been spatially separated for each destination due to the multiplication, to the branches 42-1~42-N as digital baseband signals.

The data processing unit 48 may learn a weight for an adaptive array antenna by applying an adaptive algorithm, such as RLS (Recursive Least Square), to a training field which is a known sequence received from a destination device.

If the digital baseband signal is supplied from the data processing unit 25, each of the transmitter units 46-1~46-N performs signal processing, such as encoding or modulating, on the digital baseband signal. Further, each of the transmitter units 46-1~46-N performs D/A conversion and upconversion of the digital baseband signal and supplies an analog high-frequency signal to the antenna elements 42-1~42-N. The antenna elements 42-1~42-N transmit the high-frequency signal, which is supplied from the transmitter units 46-1~46-N, as a wireless signal.

If the high-frequency signal received by the antenna elements 42-1~42-N is supplied, each of the receiver units 44-1~44-N performs downconversion and A/D conversion of the high-frequency signal. Further, each of the receiver units 44-1~44-N performs signal processing, such as demodulation or combining, on the baseband signal which has been subjected to the A/D conversion, and supplies the signal-processed baseband signal to the data processing unit 48.

The data processing unit 48 multiplies the baseband signal supplied from the receiver units 44-1~44-N by a reception weight for an adaptive array antenna. The data processing unit 48 supplies a transmission packet allocated for its own device among the transmission packets, which have been spatially separated by the multiplication, to an upper-layer application. If the wireless communication device employs a MIMO technique, the spatial separation may include separation of spatially multiplexed MIMO channels in addition to separation of transmission packets for each destination.

The data processing unit 48 performs processing of the communication protocol in the MAC (Media Access Control) layer for communication by the branches 40-1 to 40-N. Specifically, the data processing unit 48 realizes access control by generating or instructing to transmit a data packet or ACK packet having information for use other than the NAV setting written in the Duration field.

<4. Description of Each Embodiment>

The basic structure of wireless communication devices such as the access point 10 and the stations 20 has been described. Next, each embodiment of the present disclosure will be described in detail.

[4-1. First Embodiment]

The access point 10 according to the present embodiment, as described with reference to FIG. 2, spatially multiplexes a data packet to each of the stations 20 before transmission. Then, when each of the stations 20 receives the data packets normally, the station 20 transmits ACK to the access point 10. If each of the stations 20 transmits ACK at the same time, ACKs collide in the access point 10 and thus, as shown in FIG. 2, it is desirable that each of the stations 20 transmit ACK in a timely distributed manner.

Thus, the access point 10 according to the first embodiment of the present disclosure employs the Duration field to control ACK transmission by each of the stations 20. The access point 10 according to the first embodiment will be described specifically below with reference to FIG. 10.

(Communication Sequence)

Figure 10:
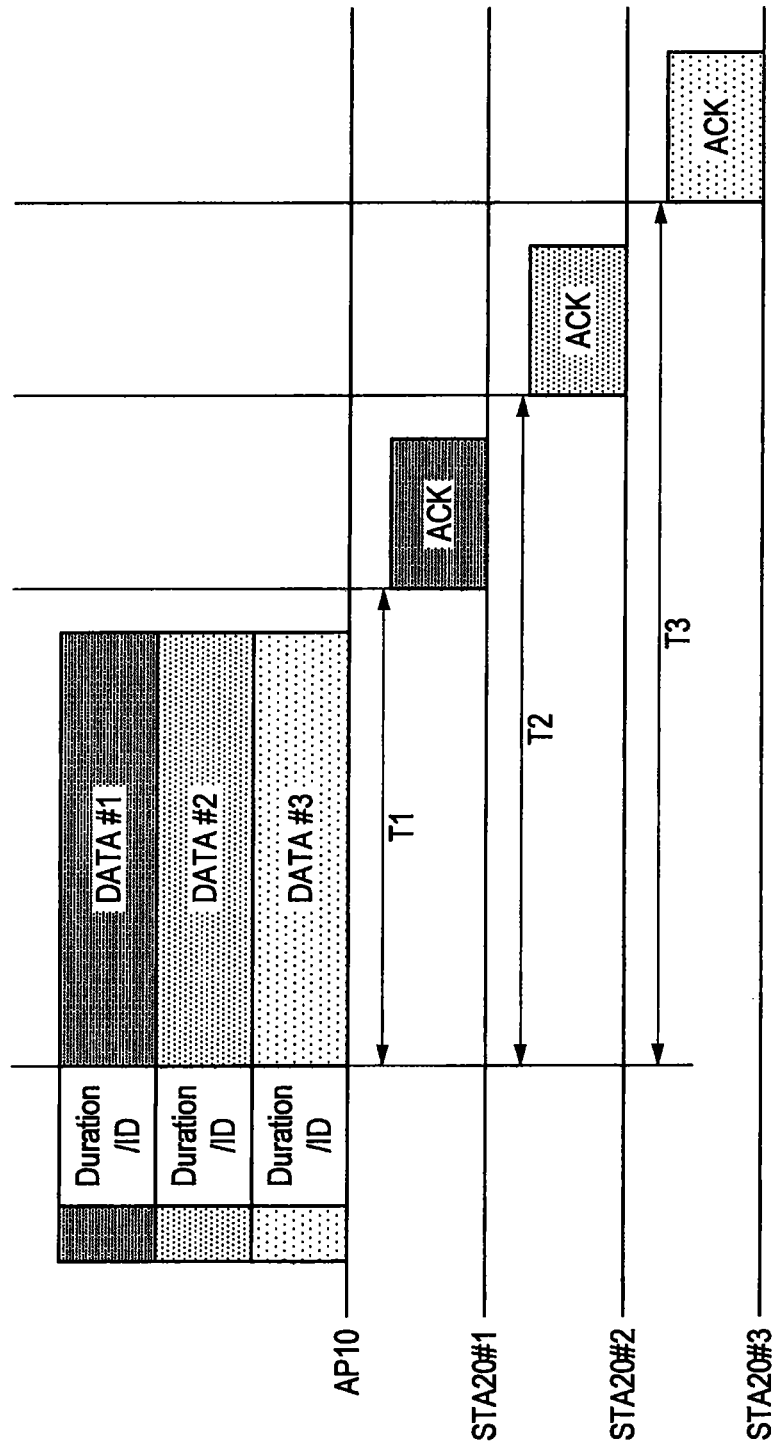
FIG. 10 is an explanatory diagram illustrating a communication sequence according to a first embodiment of the present disclosure.

FIG. 10 is an explanatory diagram illustrating a communication sequence according to the first embodiment of the present disclosure. As shown in FIG. 10, the data processing unit 48 of the access point 10 sets offset information T to the Duration field in a data packet to each of the stations 20.

The offset information T is timing information to specify the transmission timing of ACK from each of the stations 20. More specifically, the offset information T is information to specify a time interval between the end of receipt of the Duration field and ACK transmission.

The data processing unit 48 of each of the stations 20#1 to 20#3 checks the offset information T set to the data packet and, as shown in FIG. 10, causes each of the branches 40 to transmit ACK in transmission timing specified by the offset information T.

Specifically, the station 20#1 checks offset information T1 set to the Duration field of a data packet (DATA#1) and starts the transmission of ACK when the time indicated by the offset information T1 after the end of receipt of the Duration field passes. Similarly, the station 20#2 starts the transmission of ACK when the time indicated by offset information T2 after the end of receipt of the Duration field of a data packet (DATA#2) passes and the station 20#3 starts the transmission of ACK when the time indicated by offset information T3 after the end of receipt of the Duration field of a data packet (DATA#3) passes.

Thus, the access point 10 according to the present embodiment sets the offset information T to the Duration field so that ACK transmitted by each of the stations 20 does not overlap on a time axis. With the above structure, the collision of ACK in the access point 10 can be avoided without providing a new field to set the offset information T.

(Operation of the Access Point 10)

In the foregoing, the communication sequence according to the present embodiment has been described. Next, a detailed operation of the access point 10 according to the present embodiment will be described with reference to FIG. 11.

Figure 11:
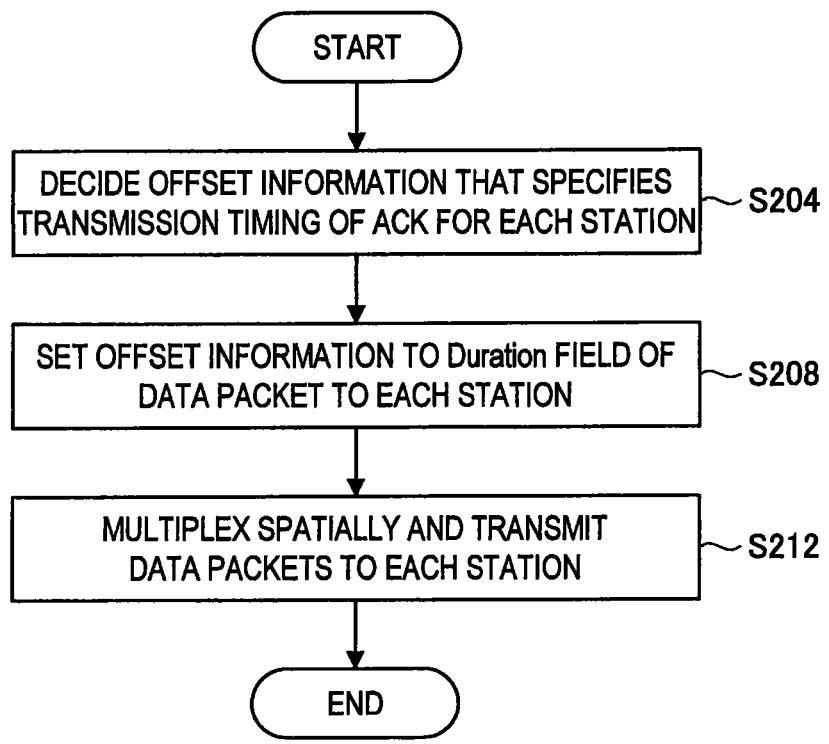
FIG. 11 is a flow chart illustrating an operation of an access point according to the present embodiment.

FIG. 11 is a flow chart illustrating the operation of the access point 10 according to the present embodiment. As shown in FIG. 11, the data processing unit 48 of the access point 10 decides the offset information T specifying the transmission timing of ACK for each of the stations 20 as destinations by SDMA (S204).

Then, the data processing unit 48 of the access point 10 sets the offset information T decided in S204 to the Duration field of the data packet to each of the stations 20 (S208).

Then, the branches 40 of the access point 10 spatially multiplex the data packets to each of the stations 20 generated by the data processing unit 48 before transmission (S212).

(Operation of the Station 20)

Figure 12:
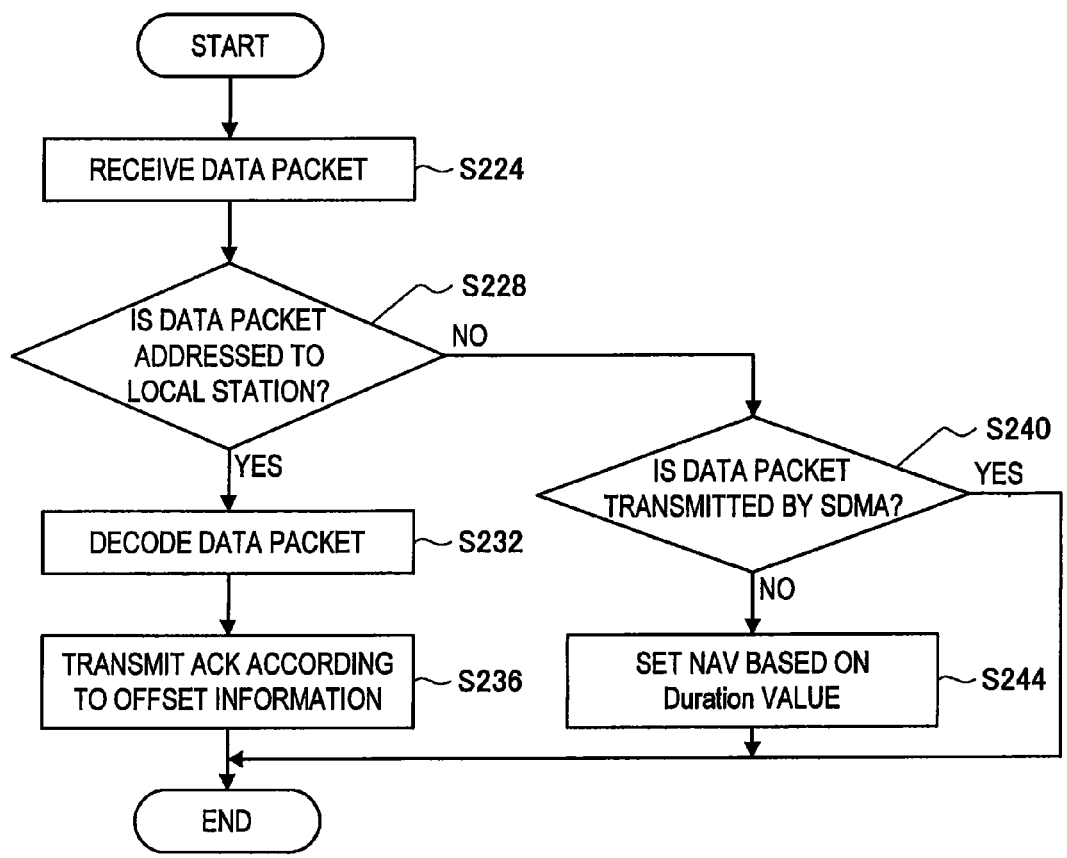
FIG. 12 is a flow chart illustrating an operation of a station according to the present embodiment.

Next, an operation of the station 20 according to the present embodiment will be described with reference to FIG. 12. FIG. 12 is a flow chart illustrating an operation of the station 20 according to the present embodiment. As shown in FIG. 12, when a data packet is received (S224), the station 20 determines whether the data packet is addressed to the local station (S228).

If the data packet is addressed to the local station, the station 20 decodes the data packet (S232). Further, after the data packet being normally decoded, the station 20 transmits ACK in the timing according to the offset information set to the Duration field of the data packet (S236).

If the data packet is not addressed to the local station, on the other hand, the station 20 determines whether the data packet is a SDMA-transmitted data packet, that is, whether the data packet is transmitted according to IEEE 802.11ac (S240). If, for example, the access point 10 sets a flag indicating IEEE 802.11ac to the header (for example, the PHY header or MAC header) of a data packet to be transmitted according to IEEE 802.11ac, the station 20 may make the determination in S240 based on the presence/absence of the flag. Alternatively, if the access point 10 transmits a data packet by changing the modulation method of a portion of a frame, instead of explicitly setting a flag, the station 20 may make the determination in S240 based on the modulation method in the frame.

If the data packet is not a data packet transmitted according to IEEE 802.11ac, the station 20 sets NAV based on the Duration value set to the Duration field of the data packet (S244). If the data packet is a data packet transmitted according to IEEE 802.11 ac, on the other hand, the station 20 discards the data packet without setting NAV before terminating the processing.

By designing the station 20 so that NAV is not set based on the Duration field of a data packet transmitted according to IEEE 802.11ac as described above, malfunctioning of the station 20 can be prevented. However, the method of preventing malfunctioning of the station 20 is not limited to the above example. For example, when the Duration field is employed for use other than the NAV setting, the access point 10 may set a specific flag to the Duration field. In this case, the station 20 can determine whether the Duration field is employed for the NAV setting based on presence/absence of a specific flag.

<4-2. Second Embodiment>

In the first embodiment, setting the offset information T specifying the time interval between the end of receipt of the Duration field and ACK transmission to the Duration field has been described. However, information set to the Duration field to specify the timing of ACK transmission from the station 20 is not limited to such an example. For example, as will be described below as the second embodiment, the access point 10 may set offset information T' specifying the time interval between the end of receipt of a data packet and ACK transmission to the Duration field.

Figure 13:
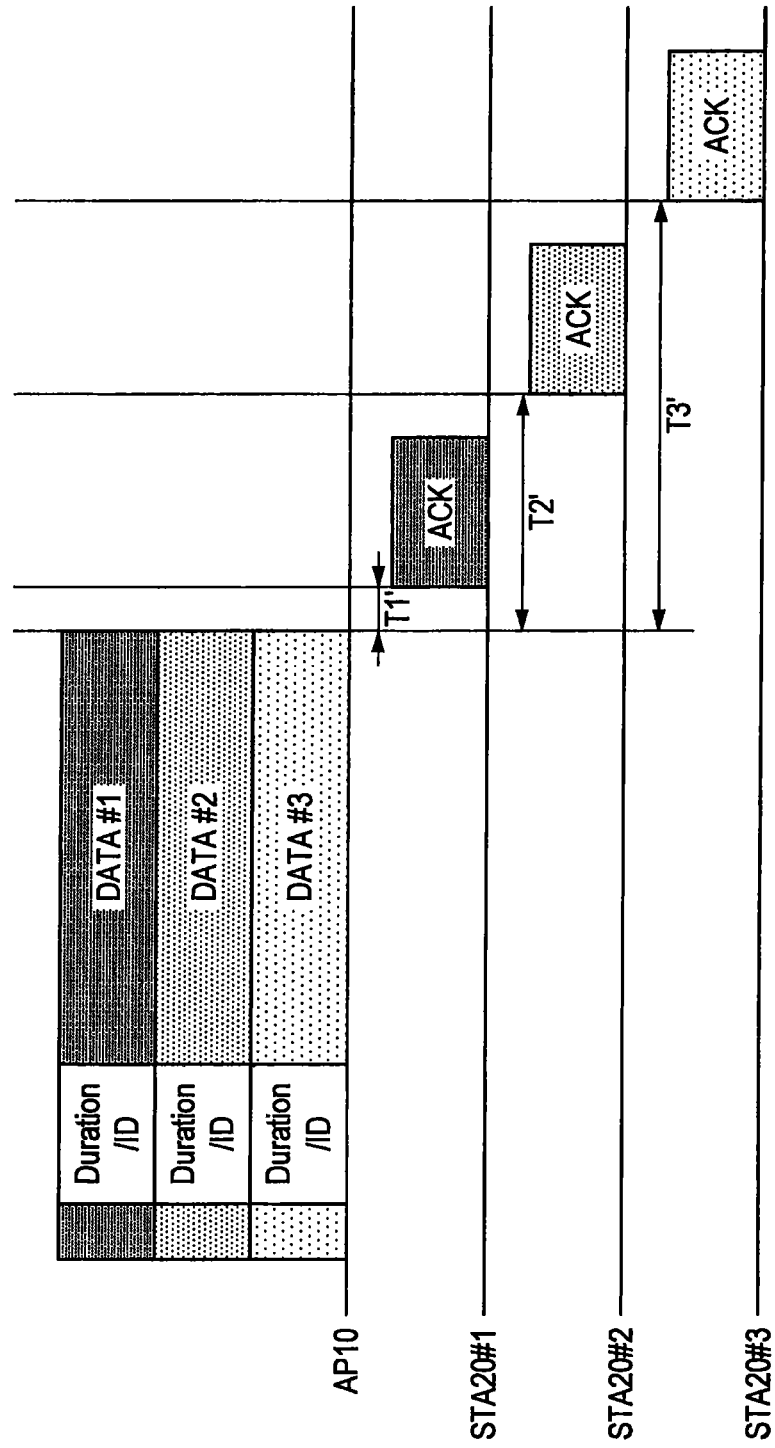
FIG. 13 is an explanatory diagram illustrating a communication sequence according to a second embodiment of the present disclosure.

FIG. 13 is an explanatory diagram illustrating a communication sequence according to the second embodiment of the present disclosure. As shown in FIG. 13, the data processing unit 48 of the access point 10 sets offset information T' to the Duration field in a data packet to each of the stations 20.

The offset information T' is timing information to specify the transmission timing of ACK from each of the stations 20. More specifically, the offset information T' is information to specify a time interval between the end of receipt of a data packet and ACK transmission.

The data processing unit 48 of each of the stations 20#1 to 20#3 checks the offset information T' set to the data packet and, as shown in FIG. 13, causes each of the branches 40 to transmit ACK in transmission timing specified by the offset information T'.

Specifically, the station 20#1 checks offset information T1' set to the Duration field of a data packet (DATA#1) and starts the transmission of ACK when the time indicated by the offset information T1' after the end of receipt of the data packet passes. Similarly, the station 20#2 starts the transmission of ACK when the time indicated by offset information T2' after the end of receipt of a data packet (DATA#2) passes and the station 20#3 starts the transmission of ACK when the time indicated by offset information T3' after the end of receipt of a data packet (DATA#3) passes.

Thus, an effect equivalent to that in the first embodiment can also be obtained by setting the offset information T' specifying the time interval between the end of receipt of a data packet and ACK transmission to the Duration field.

Further, information set to the Duration field is not limited to the offset information T or the offset information T' described above if the information specifies the timing to transmit ACK from the station 20. For example, the access point 10 may set information indicating the point in time when ACK should be transmitted to the Duration field or information indicating the order of ACK transmission by each of the stations 20 to the Duration field.

<4-3. Third Embodiment>

Next, the third embodiment of the present disclosure will be described. The access point 10 according to the third embodiment sets information indicating the position of padding added to a data packet to the Duration field of the data packet. After the reason for adding padding to a data packet is described, the third embodiment will be described in more detail.

If the lengths of data packets transmitted by the access point 10 after being multiplexed and addressed to each of the stations 20 are different, the total transmission power changes sharply due to fluctuations in multiplexed packet number during transmission of packets. As a result, received power of data packets in the station 20 also changes sharply, causing an unstable operation regarding automatic gain control. In addition, various problems are assumed due to variations in distribution of received power in data packets.

Thus, if the lengths of transmission data to each of the stations 20 are different, the access point 10 can make the packet lengths of data packets to each of the stations 20 uniform by adding padding. However, when padding is added, it is important for the access point 10 to notify the station 20 of the effective data length (or the addition position of padding) in a data packet for normal receiving processing by the station 20.

Thus, the access point 10 according to the third embodiment of the present disclosure sets information indicating the effective data length (or the addition position of padding) in a data packet to the Duration field. The access point 10 according to the third embodiment will be described more specifically below with reference to FIG. 14.

Figure 14:
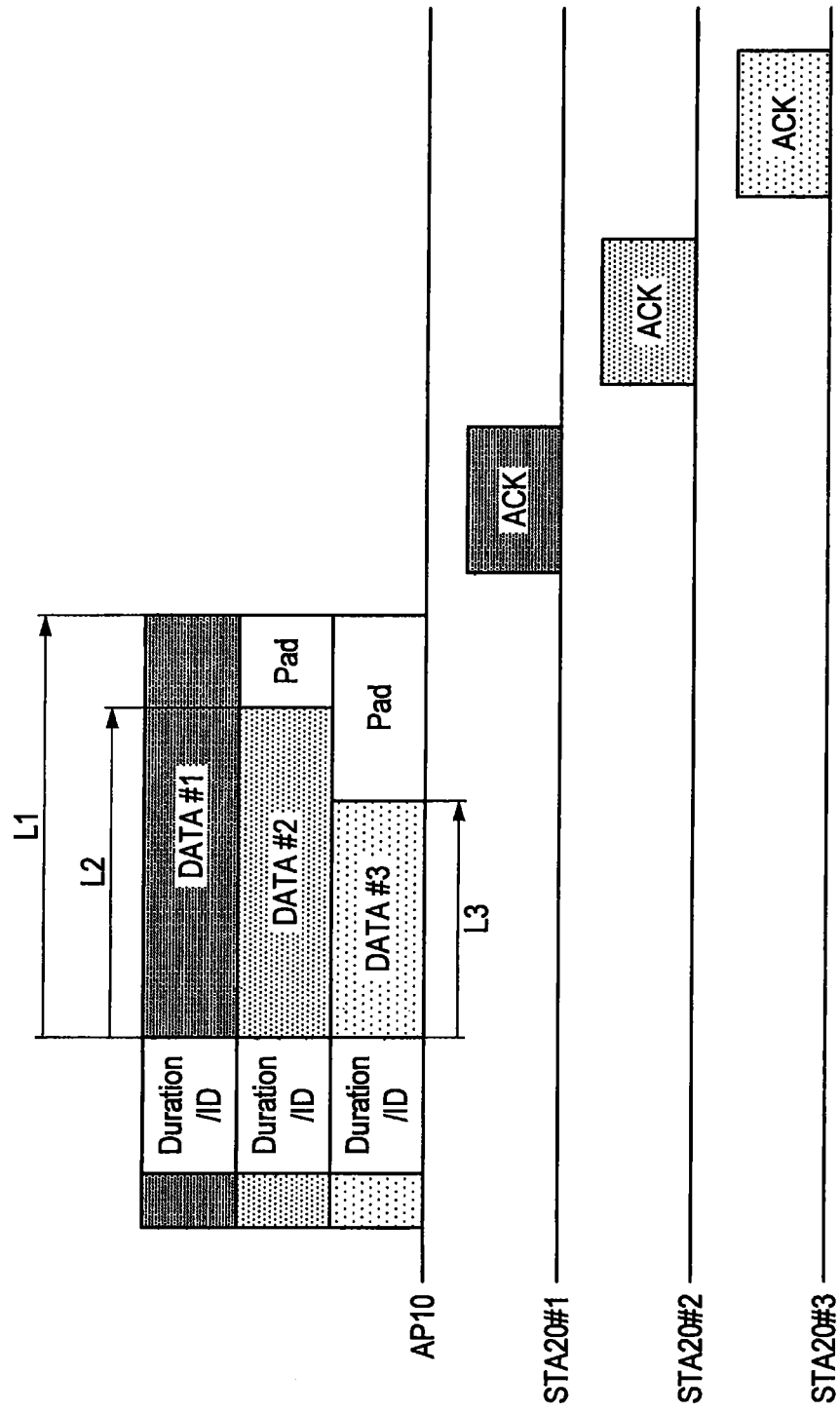
FIG. 14 is an explanatory diagram illustrating a communication sequence according to a third embodiment of the present disclosure.

FIG. 14 is an explanatory diagram illustrating a communication sequence according to the third embodiment of the present disclosure. If the lengths of transmission data to each of the stations 20 are different, as shown in FIG. 14, the access point 10 adds padding to make the data lengths of data packets #1 to #3 uniform. According to an example shown in FIG. 14, the length of transmission data to the station 20#1 is the longest and thus, the access point 10 makes the packet lengths of data packets uniform by adding padding to the data packet #2 to the station 20#2 and the data packet #3 to the station 20#3.

Further, the access point 10 sets information indicating the effective data length in each data packet to the Duration field of the data packet. Specifically, the access point 10 sets information indicating a data length L1 of the data packet #1 up to the end to the Duration field of the data packet #1 to the station 20#1. The access point 10 also sets a data length L2 up to the starting position of padding (Pad) to the Duration field of the data packet #2 to the station 20#2. Similarly, the access point 10 sets a data length L3 up to the starting position of padding (Pad) to the Duration field of the data packet #3 to the station 20#3.

With the above structure, the station 20 having received a data packet can grasp an effective data portion in the data packet based on information set to the Duration field.

FIG. 14 shows an example in which padding is added to the end of a data packet, but the addition position of padding is not limited to the end of a data packet. For example, the access point 10 may add padding to the front of a data packet or at predetermined intervals of symbols. Even in these cases, the access point 10 can notify the station 20 of the addition position or addition method of padding by employing the Duration field.

<5. Summary>

According to each embodiment of the present disclosure, as described above, the Duration field in a data packet can be employed for use other than the NAV setting. That is, according to each embodiment of the present disclosure, the packet structure can be made more efficient by effectively employing an existing field in a data packet to compress control information.

The preferred embodiments of the present technology has been described in detail with reference to the appended drawings, but the technical scope of the present disclosure is not limited to the above examples. It should be understood by those skilled in the art that various modifications or alterations may occur within the scope of the technical spirit described in claims and they are within the technical scope of the present invention.

For example, the above embodiments have been described by focusing on examples in which the access point 10 and the stations 20 conform to IEEE 802.11ac, but the present disclosure can also be applied to the access point 10 conforming to other communication standards such as IEEE 802.11n. That is, setting information for use other than the NAV setting to the Duration field in a data packet can also be implemented in the access point 10 conforming to IEEE 802.11n.

In addition, it should be noted that in the present invention, the steps of the operations of the access point 10 and the station 20 are not necessarily performed in time series in the order described in the sequence chart or the flow chart. For example, the steps of the operations of the access point 10 and the station 20 may be processed in a different order from the order described in the flow chart or in a parallel manner.

In addition, it is possible to make a computer program configured for hardware, such as CPU, ROM and RAM, which is incorporated in the access point 10 and the station 20, to execute the same function as that of each of elements of the access point 10 and the station 20. Further, a storage medium for storing the computer program is also provided.

REFERENCE SIGNS LIST

10 Access point
20 Station
40 Branch
42 Antenna element
44 Receiver unit
46 Transmitter unit
48 Data processing unit

The invention claimed is:

1. A wireless communication device, comprising:
a circuitry configured to:
  generate a plurality of data packets that includes a Media Access Control (MAC) header, wherein the MAC header further includes a Duration field;
  set information for use other than a Network Allocation Vector (NAV) setting to the Duration field in each of the plurality of data packets, wherein the Duration field further includes information for the NAV setting;
  multiplex the plurality of data packets, wherein at least one of the plurality of data packets has padding to cause packet lengths of the plurality of data packets to match added thereto;
  set information to identify a position of the padding in the at least one of the plurality of data packets to the Duration field in the at least one of the plurality of data packets; and
  transmit the generated plurality of data packets.

2. The wireless communication device according to claim 1, wherein the circuitry is further configured to set timing information specifying transmission timing of an acknowledge packet to corresponding one of the plurality of generated data packets, from a corresponding destination wireless communication device, to the Duration field in the corresponding one of the plurality of generated data packets.

3. The wireless communication device according to claim 2, wherein
  the circuitry is further configured to set the timing information to the Duration field of each of the plurality of generated data packets so that the transmission timing of the acknowledge packet from each of a plurality of the destination wireless communication devices is different.

4. The wireless communication device according to claim 3, wherein the circuitry is further configured to set the timing information so that the acknowledge packet transmitted from each of the plurality of the destination wireless communication devices is not overlapped on a time axis.

5. The wireless communication device according to claim 4, wherein the timing information is information specifying a time interval between an end of receipt of the Duration field and transmission of the acknowledge packet.

6. The wireless communication device according to claim 4, wherein the timing information is information specifying a time interval between an end of receipt of a corresponding data packet from the plurality of data packets and transmission of the acknowledge packet.

7. A non-transitory computer-readable storage medium having stored thereon, a set of computer executable instructions for causing a computer to perform steps comprising:
generating a plurality of data packets including a Media Access Control (MAC) header, wherein the MAC header further includes a Duration field;
setting information for use other than a Network Allocation Vector (NAV) setting to the Duration field in each of the plurality of data packets, wherein the Duration field further includes information for the NAV setting;
multiplexing the plurality of data packets, wherein at least one of the plurality of data packets has padding to cause packet lengths of the plurality of data packets to match added thereto;
setting information to identify a position of the padding in the at least one of the plurality of data packets to the Duration field in the at least one of the plurality of data packets; and
transmitting the generated plurality of data packets.

8. A wireless communication method, comprising:
generating a plurality of data packets including a Media Access Control (MAC) header having a Duration field to which information for use other than a Network Allocation Vector (NAV) setting is set, wherein the Duration field further includes information for the NAV setting;
multiplexing the plurality of data packets, wherein at least one of the plurality of data packets has padding to cause packet lengths of the plurality of data packets to match added thereto;
setting information to identify a position of the padding in the at least one of the plurality of data packets to the Duration field in the at least one of the plurality of data packets; and
transmitting the generated plurality of data packets.

9. A wireless communication system, comprising:
a first wireless communication device; and
a second wireless communication device having circuitry configured to:
generate a plurality of data packets including a Media Access Control (MAC) header having a Duration field to which information for use other than a Network Allocation Vector (NAV) setting is set, wherein the Duration field further includes information for the NAV setting;
multiplex the plurality of data packets, wherein at least one of the plurality of data packets has padding to cause packet lengths of the plurality of data packets to match added thereto;
set information to identify a position of the padding in the at least one of the plurality of data packets to the Duration field in the at least one of the plurality of data packets; and
transmit the generated plurality of data packets to the first wireless communication device.

* * * * *